(12) United States Patent
Matousek et al.

(10) Patent No.: US 11,847,433 B2
(45) Date of Patent: Dec. 19, 2023

(54) SOURCE CODE EDITING COMBINING EDIT AND CONTINUE WITH HOT RELOAD

(71) Applicant: Microsoft Technology Licensing, LLC, Redmond, WA (US)

(72) Inventors: Tomas Matousek, Redmond, WA (US); Gregory Bernard Miskelly, Seattle, WA (US); Isadora Sophia Garcia Rodopoulos, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 17/472,160

(22) Filed: Sep. 10, 2021

(65) Prior Publication Data

US 2023/0080221 A1   Mar. 16, 2023

(51) Int. Cl.
*G06F 9/44* (2018.01)
*G06F 9/455* (2018.01)
(Continued)

(52) U.S. Cl.
CPC .................. *G06F 8/34* (2013.01); *G06F 8/71* (2013.01); *G06F 11/3624* (2013.01)

(58) Field of Classification Search
CPC ........... G06F 8/34; G06F 8/71; G06F 11/3624
See application file for complete search history.

(56) References Cited

U.S. PATENT DOCUMENTS

| | | | | |
|---|---|---|---|---|
| 6,836,884 B1 * | 12/2004 | Evans | ........................ | G06F 8/48 717/124 |
| 10,572,245 B1 * | 2/2020 | Doebel | ..................... | G06F 8/65 |
| 10,795,659 B1 * | 10/2020 | Kinsburskiy | .............. | G06F 8/65 |
| 11,474,796 B1 * | 10/2022 | Mather | ..................... | G06F 8/77 |

(Continued)

FOREIGN PATENT DOCUMENTS

| | | | |
|---|---|---|---|
| CN | 104991866 A | * | 10/2015 |
| CN | 111880804 A | * | 11/2020 |

OTHER PUBLICATIONS

Dmitry Lyalin, Introducing the .NET Hot Reload experience for editing code at runtime, May 2021. https://devblogs.microsoft.com/dotnet/introducing-net-hot-reload/ (Year: 2021).*

Steven P. Reiss, SEEDE: Simultaneous Execution and Editing in a Development Environment, 2018, pp. 1-12. https://dl.acm.org/doi/10.1145/3238147.3238182 (Year: 2018).*

Haven Skinner, LiveSim: A Fast Hot Reload Simulator for HDLs, 2020, pp. 1-10. https://ieeexplore.ieee.org/stamp/stamp.jsp?tp=&arnumber=9238634 (Year: 2020).*

(Continued)

*Primary Examiner* — Mongbao Nguyen
(74) *Attorney, Agent, or Firm* — WORKMAN NYDEGGER (57) ABSTRACT

A change to a first version of source code of an application that is running with a debugger attached is identified, resulting in a second version of the source code. It is determined whether the change occurred with corresponding software suspended or not. The change is applied to the software without restarting the software, based on applying the change using edit and continue (EnC) when the change occurred with the software suspended, or applying the change using hot reload when the change occurred with the software not suspended. Subsequently, the software is suspended, and debug state is presented. The presentation includes presenting the second version of the source code after EnC, or after hot reload and when the software is suspended in an updated memory entity; or presenting the first version of the source code after hot reload and when the software is suspended in a stale memory entity.

18 Claims, 7 Drawing Sheets

(51) Int. Cl.
  *G06F 8/34*    (2018.01)
  *G06F 8/71*    (2018.01)
  *G06F 11/36*   (2006.01)

(56) References Cited

U.S. PATENT DOCUMENTS

| | | |
|---|---|---|
| 2005/0034109 A1 | 2/2005 | Hamilton et al. |
| 2015/0378870 A1* | 12/2015 | Marron ................. G06F 11/362 717/128 |
| 2016/0216962 A1* | 7/2016 | Wang .................... G06F 9/4856 |
| 2018/0107585 A1* | 4/2018 | Ramesh .................. G06F 8/443 |
| 2019/0213101 A1* | 7/2019 | Raviv ................... H04L 51/046 |
| 2021/0117308 A1 | 4/2021 | Burgos |
| 2022/0197777 A1* | 6/2022 | Souders .............. G06F 11/3628 |

OTHER PUBLICATIONS

David Ramel, Hot Reload Now Works with C++ Apps, with Blazor WebAssembly Support on Tap, Jul. 29, 2021, pp. 1-9. https://visualstudiomagazine.com/articles/2021/07/29/cpp-hot-reload.aspx (Year: 2021).*

Johannes Henning, Hot Code Patching in CPython, 2019, pp. 1-7. https://dl.acm.org/doi/pdf/10.1145/3340670.3342424 (Year: 2019).*

"International Search Report and Written Opinion Issued in PCT Application No. PCT/US22/037525", dated Oct. 25, 2022, 14 Pages. (MS# 410385-WO-PCT).

"F5 Hot Reload #52101", Retrieved from: https://github.com/dotnet/roslyn/pull/52101, Mar. 26, 2021, 6 Pages.

* cited by examiner

SOURCE CODE EDITING COMBINING EDIT AND CONTINUE WITH HOT RELOAD

BACKGROUND

Developing and debugging software applications is an iterative process. For example, a developer may frequently go through a development workflow that includes (i) running a subject application, (ii) identifying an application feature that needs to be modified or added, (iii) making changes to one or more source files for the subject application (e.g., using an editor) to implement the modification/addition, (iv) rebuilding the subject application (e.g., using a compiler toolchain), (v) restarting the subject application, and (vi) interacting with the subject application to validate the modification/addition. This workflow can be cumbersome and time consuming, and the act of rebuilding and restarting the subject application can take significant time.

At times, running the subject application additionally involves attaching a debugger to the application to aid in testing and debugging the application. While debuggers have a variety of features, a primary use of a debugger is to enable the developer to track the subject application's operations in-progress and monitor changes in computer resources utilized by the application. Most debuggers include the ability to suspend execution of the subject application at specific points (e.g., using breakpoints or watchpoints). When a subject application is suspended at a breakpoint or watchpoint, some debuggers show the location in original source code and/or a machine code disassembly corresponding to the point of suspension.

BRIEF SUMMARY

Some development environments include, or interoperate with, debuggers to implement support for edit and continue (EnC) technology. When a subject application runs with a debugger attached and is suspended (e.g., based on a breakpoint or watchpoint), EnC technology is able to detect source code changes, and apply those changes "in-place" to in-memory structures corresponding to the subject application (e.g., to update existing types, objects, and stack frames of one or more active threads of the subject application) prior to the debugger resuming execution of the subject application. Thus, after resuming execution of the subject application, the application executes with those changes fully integrated. However, ENC capabilities are limited to certain kinds of source changes due to the inherent complexity of updating in-memory structures.

Alternatively, some development environments support hot reload technology. Unlike EnC technology—which operates when the subject application is running with a debugger attached and is suspended—hot reload technology operates when the subject application is actively running. Hot reload implementations detect when changes are made to one or more source files in the current session, and apply those changes to the running application. Unlike EnC technologies, these changes are not applied "in-place," but rather new types and new versions of updated methods are created, and the new versions of these updated methods are only executed when they are invoked the next time after the hot reload update. Because hot reload technologies create new types and new methods, rather than updating existing in-memory structures, hot reload technologies are often more capable as to the kinds of source changes they can support than EnC technologies. On the other hand, not being able to update existing types, objects and method frames also limits the set of scenarios in which hot reload technology is beneficial compared to EnC.

While generally aimed at similar goals (i.e., enabling source code changes to be applied to an application without restarting the application), EnC technology and hot reload technology are presently incompatible. That is, EnC technology is applicable when a debugger is attached to an application and is suspended, and hot reload technology operates when the subject application is actively running. At least some embodiments described herein address this incapability by uniquely combining both EnC and hot reload capabilities for applications running with a debugger attached. In particular, these embodiments enable a developer to apply source code changes to a subject application that executes with a debugger attached both (i) when the subject application suspended at a breakpoint or watchpoint (i.e., in an EnC mode) and (ii) when the subject application is not suspended (i.e., in a hot reload mode). In embodiments, changes made in both the EnC mode and the hot reload mode can be applied during the same debugger session, and changes made in the EnC mode interact seamlessly with changes made in hot reload mode (and vice versa). Thus, a developer can edit a source file at any point in time while the debugger is attached (i.e., whether the application is suspended by the debugger or not) and the appropriate action (i.e., an EnC mode change or a hot reload mode change) is taken when the user makes a source code change. Additionally, the embodiments herein address cases that can occur when a stale version of a method that was hot reloaded hits a breakpoint, and the old version of the source code is not present in a current source code file or editor buffer.

Combining both EnC and hot reload capabilities for applications running with a debugger attached provides many technical effects and benefits. For example, the embodiments herein remove the need for a developer to manually transition between EnC and hot reload modes; previously, a developer would be able to use one mode during a single application execution session, and would need to restart the application in order to transition to the other mode. Additionally, the embodiments herein enable code changes to be applied using hot reload even when an application is attached to a debugger.

In some embodiments, methods, systems, and computer program products enable source code editing that combines EnC with hot reload. These embodiments identify a code change to a first version of source code of a software application that is running with a debugger attached, resulting in a second version of the source code of the software application. These embodiments also determine whether the code change occurred with the software application suspended by the debugger, or with the software application not suspended by the debugger.

Based on the determining, these embodiments apply the code change to the software application without restarting the software application. The applying the code change includes performing one of applying the code change to the software application using an EnC update when the code change occurred with the software application suspended by the debugger, or applying the code change to the software application using a hot reload update when the code change occurred with the software application not suspended by the debugger. Applying the code change to the software application using an EnC update includes applying an in-place update to an existing in-memory entity corresponding to the first version of the source code to reflect the code change, transforming the existing in-memory entity into an updated existing in-memory entity corresponding to the second version of the source code. Applying the code change to the software application using a hot reload update includes creating a new in-memory entity corresponding to the second version of the source code to reflect the code change, while preserving the existing in-memory entity.

Subsequent to applying the code change to the software application without restarting the software application, these embodiments determine that the software application has been suspended by the debugger. These embodiments also include presenting, at a user interface, debug state for the software application at a suspension point. The presenting includes one of presenting at least a portion of the second version of the source code of the software application along with corresponding runtime state associated with the updated existing in-memory entity at the suspension point (i.e., based at least on the software application being suspended by the debugger while executing the updated existing in-memory entity), presenting at least a portion of the second version of the source code of the software application along with corresponding runtime state associated with the new in-memory entity at the suspension point (i.e., based at least on the software application being suspended by the debugger while executing the new in-memory entity), or presenting at least a portion of the first version of the source code of the software application along with corresponding runtime state associated with the existing in-memory entity at the suspension point (i.e., based at least on the software application being suspended by the debugger while executing the existing in-memory entity).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
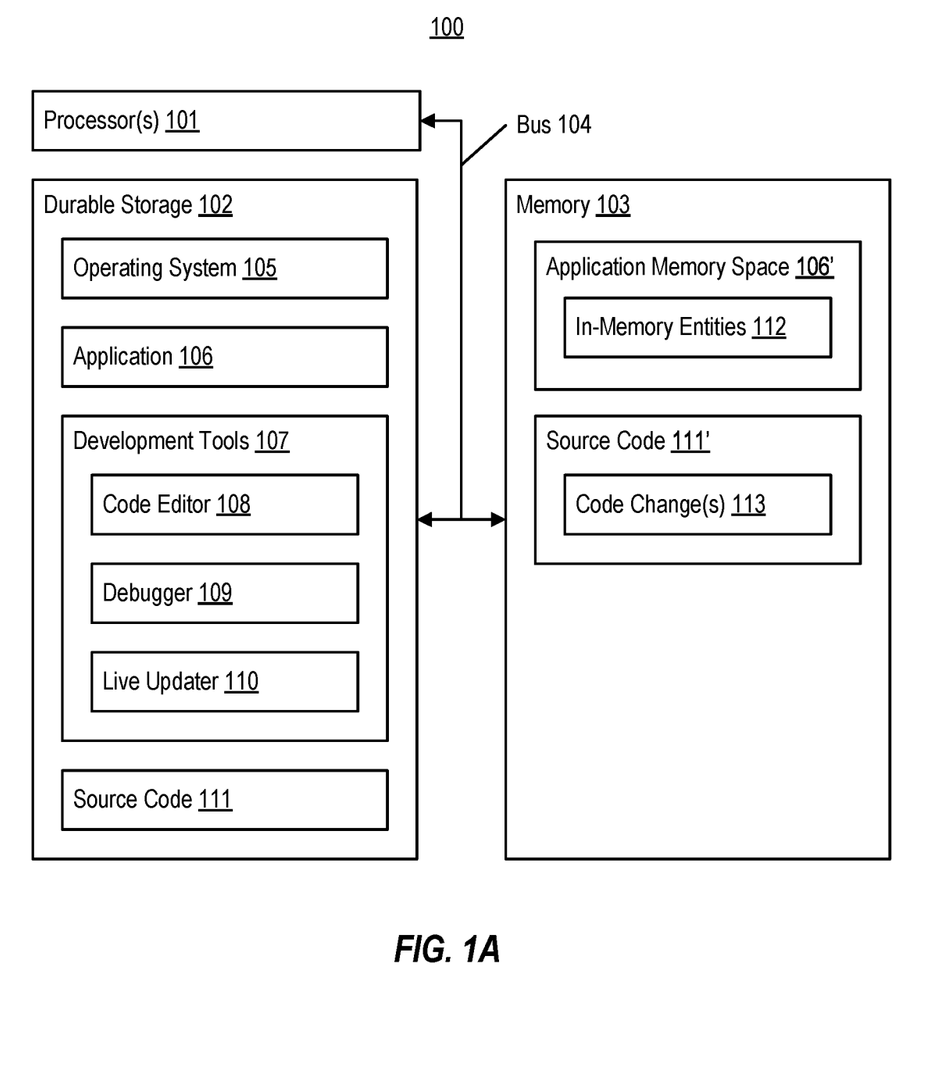
FIG. 1A illustrates an example computer architecture that facilitates enabling source code editing that combines EnC techniques with hot reload techniques.

FIG. 1A illustrates an example computer architecture 100 that facilitates enabling source code editing that combines EnC techniques with hot reload techniques. As shown, computer architecture 100 comprises or utilizes a special-purpose or general-purpose computer hardware, such as, for example, a processor 101 (or a plurality of processors), a memory 103 (e.g., main or system memory), and a durable storage 102, which are communicatively coupled using a bus 104 (or a plurality of busses).

Embodiments within the scope of the present invention include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., memory 103 and/or durable storage 102) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM (e.g., memory 103) and/or to less volatile computer storage media (e.g., durable storage 102) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the durable storage 102 stores computer-executable instructions and/or data structures corresponding to an operating system 105, an application 106, and development tools 107. The durable storage 102 also stores data, such as source code 111 of the application 106. In general, the development tools 107 are configured to develop/modify the application 106, and include, for example, a code editor 108 for editing the source code 111 of the application 106, a debugger 109 for tracing and controlling execution of the application 106, and a live updater 110 for applying code changes to the application 106 without restarting the application 106.

The memory 103 is capable of storing a broad variety of executable code and data, but for purposes of illustrating the embodiments herein, the memory 103 is shown as storing an application memory space 106', which corresponds to application 106. This application memory space 106' is shown as storing in-memory entities 112 (e.g., types, objects, stack frames, method code, etc.). The memory 103 is also shown as storing source code 111', such as source code stored in an editor buffer created by the code editor 108 as part of editing source code 111. As shown, this source code 111' includes code changes 113, such as revisions to source code 111 made with the code editor 108.

As mentioned, the development tools 107 include a live updater 110 for applying code changes to the application 106 without restarting the application 106. A variety of live update technologies, exist and are usable by the live updater 110. For example, EnC technology operates when a subject application (application 106) runs with a debugger (e.g., debugger 109) attached, and when that application is suspended at a breakpoint or watchpoint. EnC technology applies source code changes made at the suspension point "in-place" to in-memory structures (e.g., in-memory entities 112) corresponding to the subject application prior to the debugger resuming execution of the subject application. Thus, after resuming execution of the subject application, the application executes with those changes fully integrated.

Figure 2:
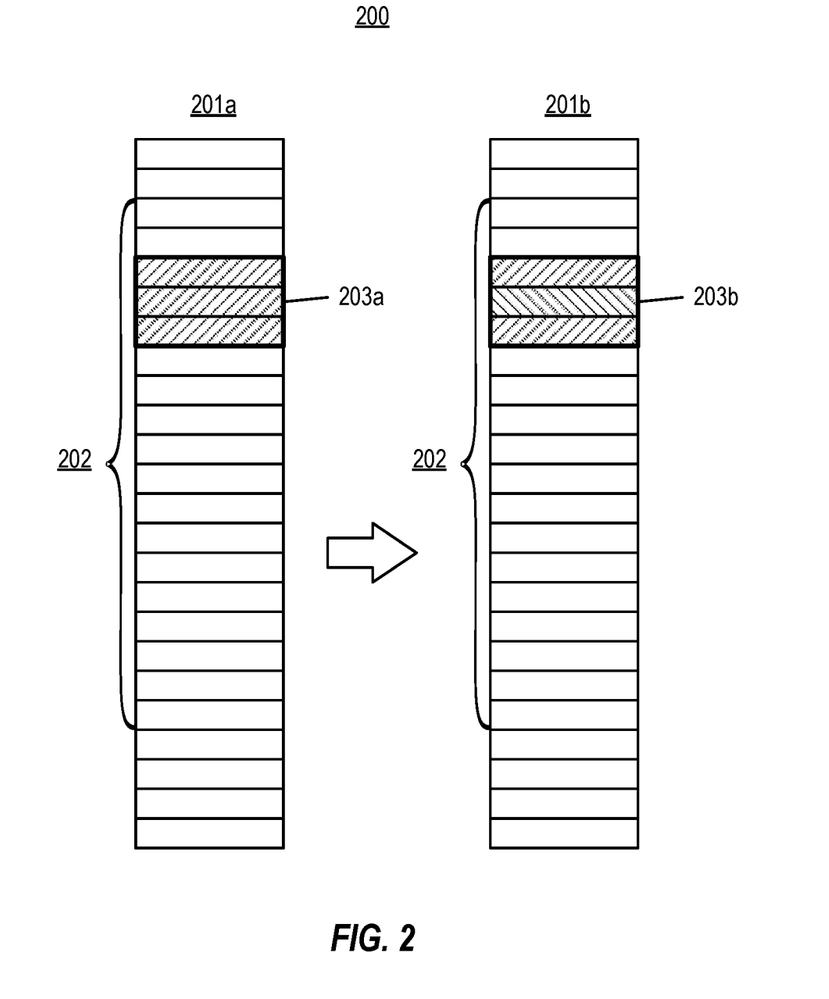
FIG. 2 illustrates an example of live code updating using EnC.

To illustrate EnC, FIG. 2 shows an example 200 of live code updating using EnC. Example 200 shows an example memory layout 201a, including an application space memory 202, such as application memory space 106' allocated to application 106 by the operating system 105. Example 200 also shows an in-memory entity 203a (e.g., one of in-memory entities 112) stored in the application space memory 202. Example 200 also shows another example memory layout 201b after an EnC update of the in-memory entity 203a, which is represented as in-memory entity 203b. Here, a change in shading between in-memory entity 203a and in-memory entity 203b shows that in-memory entity 203a has been updated in-place to transform in-memory entity 203a into in-memory entity 203b. Since there was an in-place update, all code executes based on in-memory entity 203b after code execution resumes.

In another example, hot reload technology operates only when the subject application is running without a debugger attached (and, thus, when debugger functionality such as the ability use breakpoints and watchpoints is not available). Hot reload implementations apply source code changes to the running application by creating new types and new versions of updated methods. These updated methods are then executed when they are next invoked after the hot reload update. Thus, when an application is updated using hot reload, it is possible for an older "stale" version of a method that was invoked prior to the hot reload to continue executing after the hot reload (e.g., in one thread), while a new version of the method is concurrently executed (e.g., in another thread that invokes the method after the hot reload).

Figure 3:
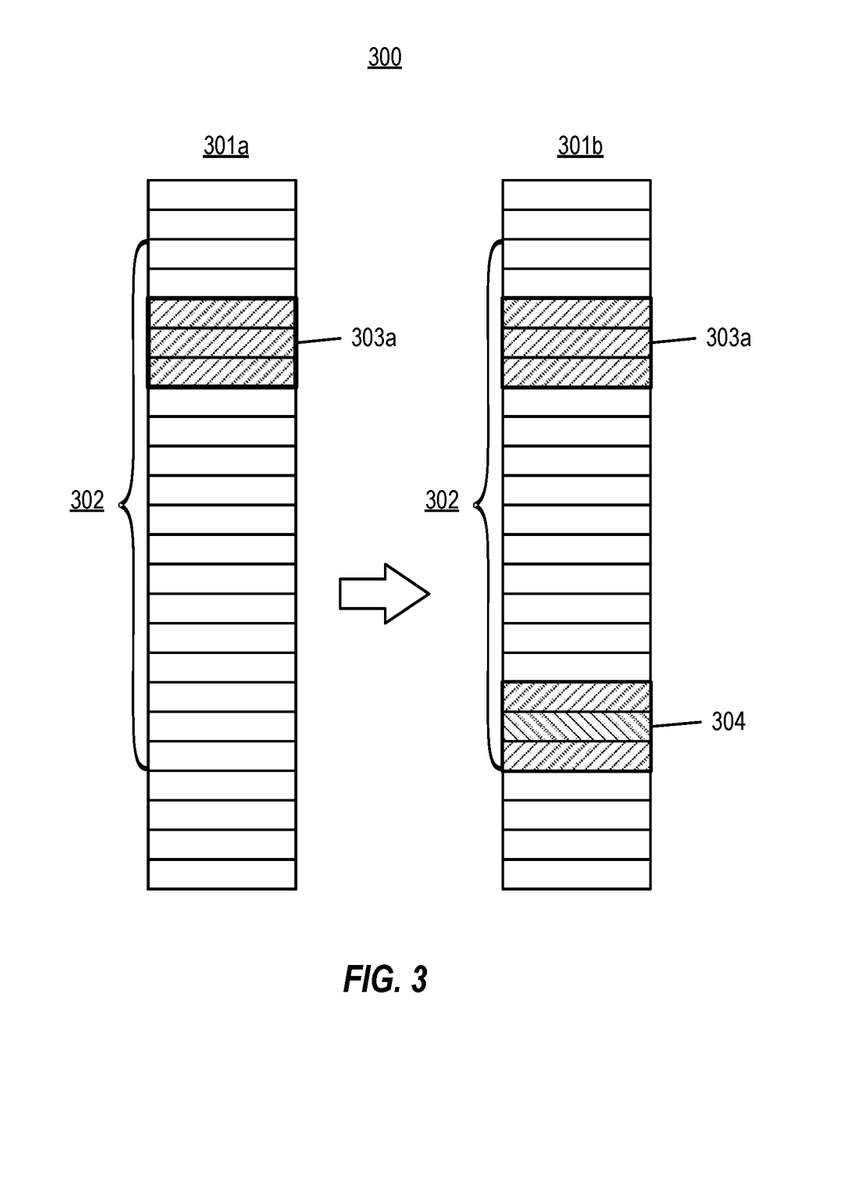
FIG. 3 illustrates an example of live code updating using hot reload.

To illustrate hot reload, FIG. 3 shows an example 300 of live code updating using hot reload. Example 300 shows an example memory layout 301a, including an application space memory 302, such as application memory space 106' for application 106. Example 300 also shows an in-memory entity 303a (e.g., one of in-memory entities 112) stored in the application space memory 302. Example 300 also shows another example memory layout 301b after a hot reload update. Here, in-memory entity 303a remains unaffected, while a new version of the in-memory entity is added as in-memory entity 304. Since there are now two versions of the in-memory entity (i.e., in-memory entity 303a and in-memory entity 304), it is possible for method invocations made before the hot reload to execute based on in-memory entity 303a, while method invocations made after the hot reload to execute based on in-memory entity 304.

EnC technology and hot reload technology are presently incompatible, since EnC technology is applicable when a debugger is attached to an application and is suspended, and hot reload technology is applicable when the subject application is actively running. In embodiments, the live updater 110 addresses this incapability by uniquely combining both EnC and hot reload capabilities when application 106 runs with the debugger 109 attached. The live updater 110 enables source code changes made to the source code 111 to be applied to the application 106 when the debugger 109 attached both (i) when the application 106 suspended by the debugger 109 at a breakpoint or watchpoint (i.e., in an EnC mode) and (ii) when the application 106 is not suspended by the debugger 109 (i.e., in a hot reload mode).

Figure 4A:
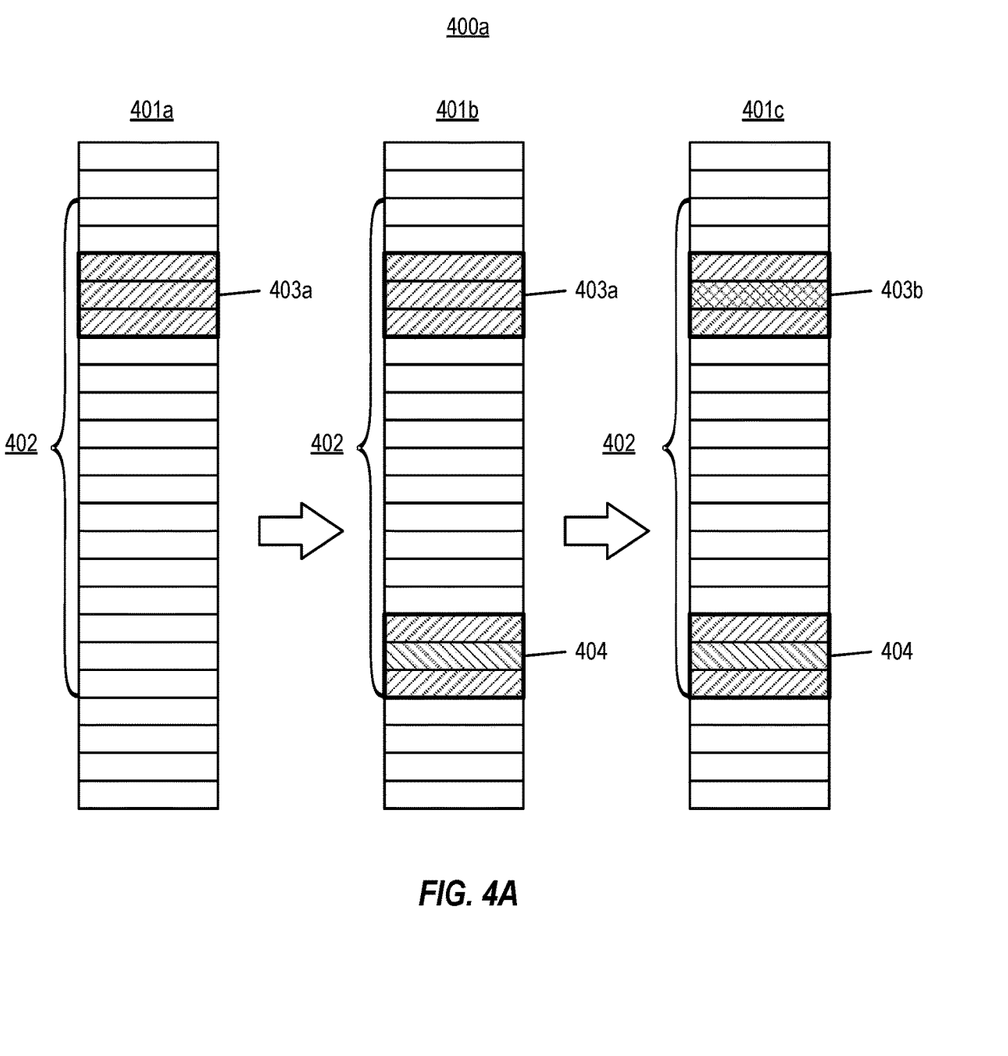
FIGS. 4A and 4B illustrate examples of live code updating using a combination of EnC and hot reload.
Figure 4B:
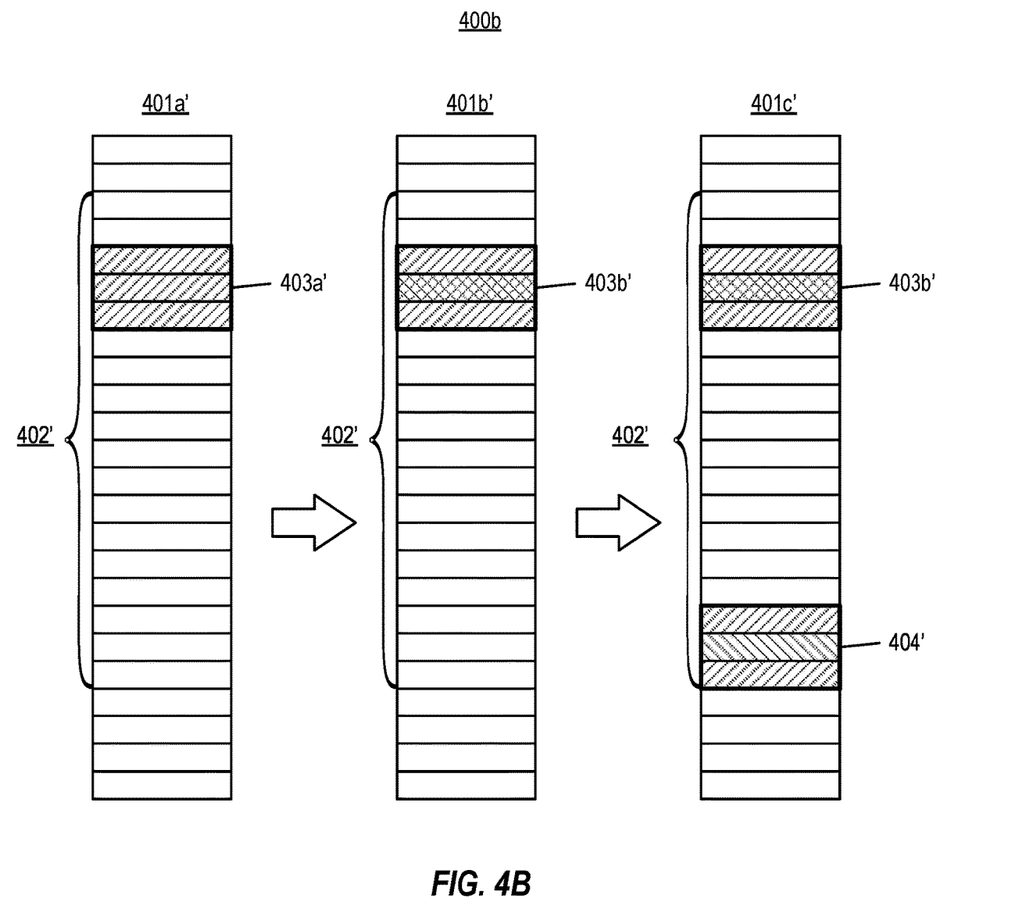

FIGS. 4A and 4B illustrate examples of live code updating using a combination of EnC and hot reload. Initially, FIG. 4A illustrates an example 400a in which a hot reload update is applied prior to an EnC update. Example 400a shows an example memory layout 401a, including an application space memory 402, such as application memory space 106' for application 106. Example 400a also shows an in-memory entity 403a (e.g., one of in-memory entities 112) stored in the application space memory 302. Example 400a also shows another example memory layout 401b after a hot reload update. Here, in-memory entity 403a remains unaffected, while a new version of the in-memory entity is added as in-memory entity 404. Example 400a also shows another example memory layout 401c after an EnC update of the in-memory entity 403a, which is represented as in-memory entity 403b.

Alternately, FIG. 4B illustrates an example 400b in which an EnC update is applied prior to a hot reload update. Example 400a shows an example memory layout 401a', including an application space memory 402', such as application memory space 106' for application 106. Example 400b also shows in-memory entity 403a'. Example 400b also shows another example memory layout 401b' after an EnC update of the in-memory entity 403a', which is represented as in-memory entity 403b'. Example 400b also shows another example memory layout 401c' after a hot reload update. Here, in-memory entity 403b' remains unaffected, while a new version of the in-memory entity is added as in-memory entity 404'.

In embodiments, changes made by the live updater 110 in both the EnC mode and the hot reload mode can be applied during the same debugger session, and changes made in the EnC mode interact seamlessly with changes made in hot reload mode (and vice versa). Thus, the source code 111' can be edited at any point in time while debugger 109 is attached to the application 106 (i.e., whether the application 106 is suspended by the debugger or not) and the live updater 110 takes appropriate action (i.e., an EnC mode change or a hot reload mode change) depending on whether the application 106 is suspended or not at the time of the change. This means that embodiments herein remove the need for a developer to manually transition between EnC and hot reload modes.

Additionally, since the application 106 can continue executing stale code after a live update (e.g., in-memory entity 403a, in-memory entity 404 in FIG. 4A; and in-memory entity 403b' in FIG. 4B), the live updater 110 addresses cases that can occur when a stale version of a method that was hot reloaded hits a breakpoint, and the old version of the source code is not present in a current source code file or editor buffer.

Figure 1B:
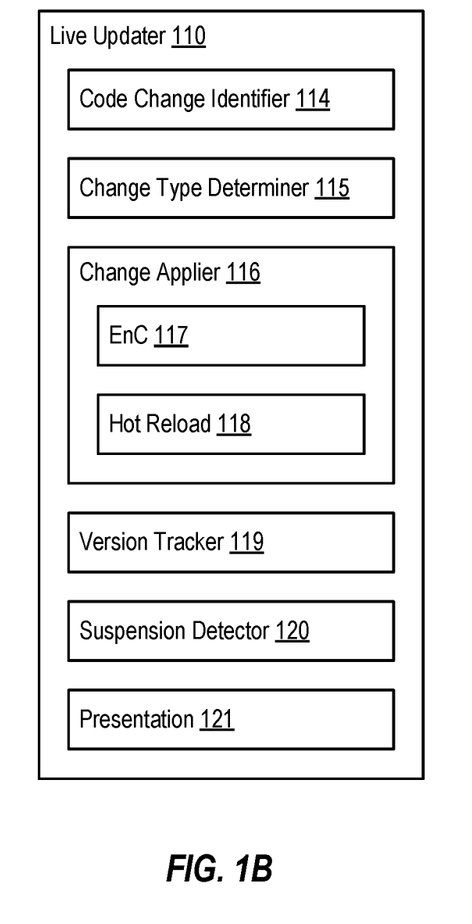
FIG. 1B illustrates example details of the live updater illustrated in FIG. 1A.

FIG. 1B illustrates example details of the live updater 110 illustrated in FIG. 1A, including example components that facilitate enabling source code editing that combines EnC techniques with hot reload techniques. It will be appreciated that the depicted components—including their identity, subcomponents, and arrangement—are presented merely as an aid in describing various embodiments of the live updater 110 described herein, and that these components are non-limiting to how software and/or hardware might implement various embodiments described herein, or of the particular functionality thereof.

Briefly, a code change identifier 114 determines when a code change 113 has been made to source code 111 and/or source code 111' corresponding to the application 106 when application 106 is attached to the debugger 109, and a version tracker 119 preserves the prior version of the source code for later presentation at a suspension point, if needed. Based on the identified code change 113, the change type determiner 115 determines an application debugging state at a time of the code change 113. In particular, the change type determiner 115 determines whether the code change 113 was received when the application 106 was suspended (e.g., a breakpoint or watchpoint) by the debugger 109, or whether the application 106 was actively executing while attached to the debugger 109. A change applier 116 then applies the change either using EnC (i.e., EnC component 117) when the code change 113 was received while the application 106 was suspended by the debugger 109, or hot reload (i.e., hot reload component 118) when the code change 113 was received while the application 106 was actively executing while attached to the debugger 109. The version tracker 119 associates existing and updated or new in-memory entities with an appropriate versions of source code. Later, a suspension detector 120 detects that the application 106 has been suspended, and the presentation component 121 presents debug state at a suspension point, including presenting an appropriate version of source code at a user interface, based on having associated in-memory entities with appropriate versions of source code. Thus, even though the application 106 may execute differing versions of in-member entities, the presentation component 121 presents a correct version of the corresponding source code. In embodiments, when presenting an older or "stale" version of source code, the presentation component 121 provides a visual indicator that the source code being presented is not the most current version.

Figure 5:
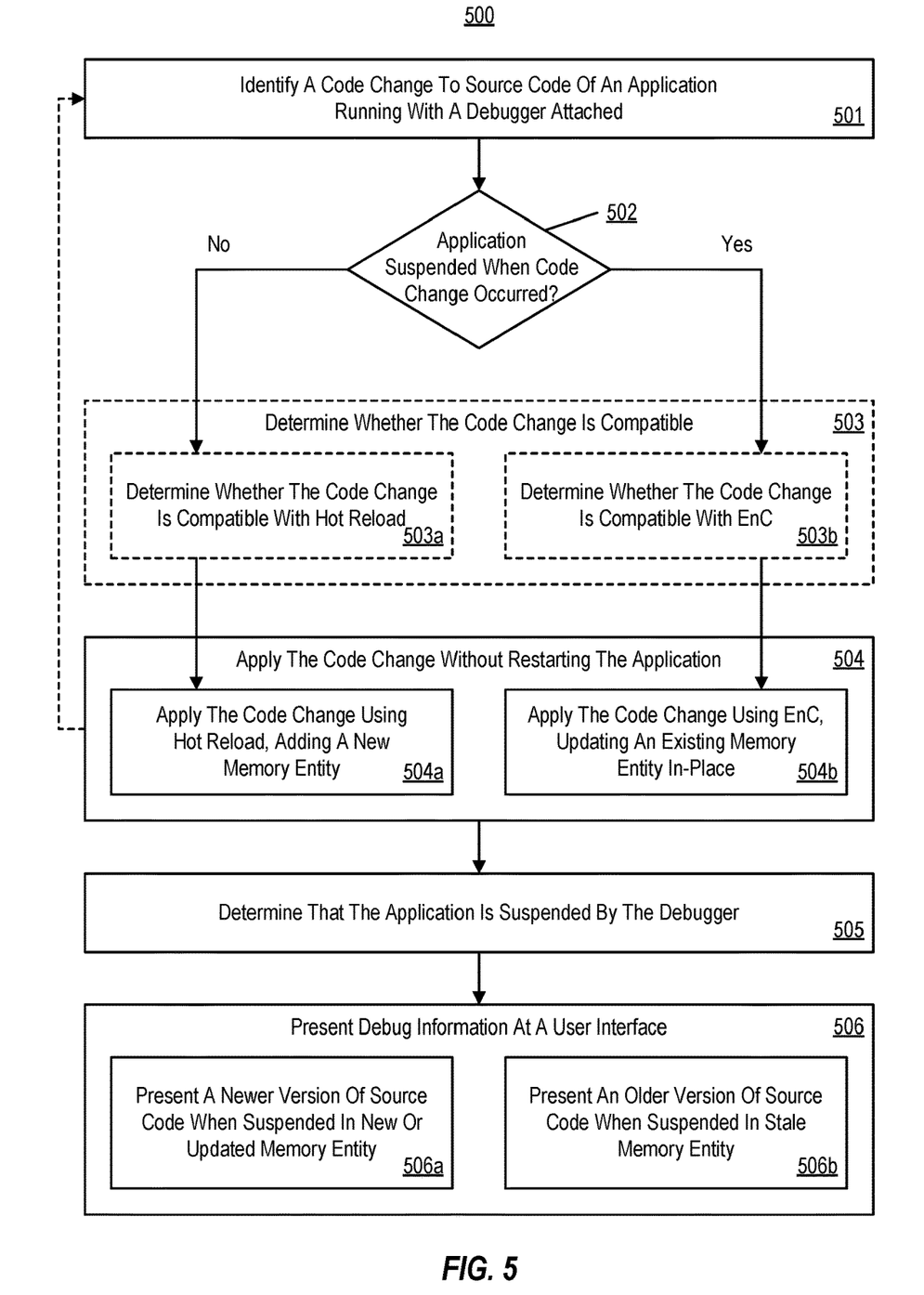
FIG. 5 illustrates a flow chart of an example method for enabling source code editing that combines EnC with hot reload.

Further description of the live updater 110 is now given within the context of FIG. 5, which illustrates a flow chart of an example method 500 for enabling source code editing that combines EnC with hot reload. As such, the following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed. In embodiments, instructions for implementing method 500 are encoded as computer-executable instructions (e.g., live updater 110) stored on a hardware storage device (e.g., durable storage 102) that are executable by a processor (e.g., processor 101) to cause a computer system (e.g., computer architecture 100) to perform method 500.

As shown in FIG. 5, method 500 comprises an act 501 of identifying a code change to source code of an application running with a debugger attached. In some embodiments, act 501 comprises identifying a code change to a first version of source code of a software application that is running with a debugger attached, resulting in a second version of the source code of the software application. In an example, after initiating execution of application 106 at the processor 101, resulting in creation of the application memory space 106', the code change identifier 114 identifies a code change 113 while the debugger 109 is attached to the application 106. In embodiments, this code change 113 carried out by the code editor 108, but the code change 113 could alternatively be made to the source code 111 in some other way. Although not shown in FIG. 5, in embodiments, method 500 comprises preserving each version of source code of the software application. In an example, the version tracker 119 saves the first and/or second version of source code (e.g., within source code 111') for later presentation, if needed.

Method 500 also comprises an act 502 of determining whether the application was suspended when the code change occurred. In some embodiments, act 502 comprises determining whether the code change occurred with the software application suspended by the debugger, or with the software application not suspended by the debugger. In an example, the change type determiner 115 determines whether the execution of the application 106 was suspended by the debugger 109 at the time that the code change 113 was made, or whether application 106 actively executing—but under control of the debugger 109—at the time that the code change 113 was made.

In some embodiments, method 500 also comprises an act 503 of determining whether the code change is compatible. In an example, depending on the outcome of act 502 (i.e., whether or the application 106 was suspended when the code change occurred) the version tracker 119 either determines whether the code change is compatible with hot reload (act 503*a*), or determines whether the code change is compatible with EnC (act 503*b*).

In embodiments, act 503*a* comprises, when the code change occurred with the software application not suspended by the debugger, determining whether the code change is compatible with hot reload, based on one or more restrictions inherent to hot reload. In an example, the change applier 116 uses the hot reload component 118 to determine if the identified code change is of a type that is compatible with hot reload. If so, the change applier 116 proceeds to act 504*a* to apply the change. Otherwise, method 500 terminates. In embodiments, hot reload has a different set of restrictions/incompatibilities than EnC.

In embodiments, act 503*b* comprises, when the code change occurred with the software application suspended by the debugger, determining whether the code change is compatible with EnC, based on one or more restrictions inherent to EnC. In an example, the change applier 116 uses the EnC component 117 to determine if the identified code change is of a type that is compatible with ENC. If so, the change applier 116 proceeds to act 504B to apply the change. Otherwise, method 500 terminates. In embodiments, EnC has a different set of restrictions/incompatibilities than hot reload.

Method 500 also comprises an act 504 of applying the code change without restarting the application. In some embodiments, act 504 comprises based on the determining, applying the code change to the software application without restarting the software application. In an example, depending on the outcome of act 502 (i.e., whether or the application 106 was suspended when the code change occurred) the change applier 116 either applies the code change using hot reload, adding a new memory entity (act 504*a*), or applies the code change using EnC, updating an existing memory entity in-place (act 504*b*).

In embodiments, act 504*a* comprises, when the code change occurred with the software application not suspended by the debugger, applying the code change to the software application using a hot reload update, including creating a new in-memory entity corresponding to the second version of the source code to reflect the code change, while preserving the existing in-memory entity. In an example, the change applier 116 uses the hot reload component 118 to apply the change using hot reload. Referring to example 400*a*, in one example the change applier 116 creates in-memory entity 404. Referring to example 400*b*, in another example the change applier 116 creates in-memory entity 404'. In embodiments, the version tracker 119 associates the first version of the source code with the existing in-memory entity, and associates the second version of the source code with the new in-memory entity.

As indicated by an arrow between act 503*a* and act 504*a*, in embodiments the code change is applied to the software application using the hot reload update only when the code change is determined to be compatible with hot reload in act 503*a*.

In embodiments, act 504*b* comprises, when the code change occurred with the software application suspended by the debugger, applying the code change to the software application using an EnC update, including applying an in-place update to an existing in-memory entity corresponding to the first version of the source code to reflect the code change, transforming the existing in-memory entity into an updated existing in-memory entity corresponding to the second version of the source code. In an example, the change applier 116 uses the EnC component 117 to apply the change using EnC. Referring to example 400*a*, in one example the change applier 116 transforms in-memory entity 403*a* into in-memory entity 403*b*. Referring to example 400*b*, in another example the change applier 116 transforms in-memory entity 403*a*' into in-memory entity 403*b*'. In embodiments, the version tracker 119 associates the first version of the source code with the existing in-memory entity, and associates the second version of the source code with the updated existing in-memory entity. In embodiments, execution of the application 106 is also resumed after act 504*b*, and prior to act 505.

As indicated by an arrow between act 503*b* and act 504*b*, in embodiments the code change is applied to the software application using the EnC update only when the code change is determined to be compatible with EnC in act 503*b*.

At some time, subsequent to completion of act 504, method 500 also comprises an act 505 of determining that the application is suspended by the debugger. In some embodiments, act 505 comprises, subsequent to applying the code change to the software application without restarting the software application, determining that the software application has been suspended by the debugger. In an example, the application 106 executes within the debugger 109 for at least some time period after act 504. This may be because the application was not suspended at the time of act 504 (i.e., act 504a), or because execution of the application was resumed after act 504 (i.e., after performance of act 504b). Regardless, the suspension detector 120 determines that execution of the application 106 has been suspended by the debugger 109.

Method 500 also comprises an act 506 of presenting debug information at a user interface. In some embodiments, act 506 comprises presenting, at a user interface, source code of the software application at a suspension point, including one of presenting a newer version of source code when suspended in a new or updated memory entity (act 506a), or presenting an older version of source code when suspended in a stale memory entity (act 506b). In an example, the presentation component 121 uses the version tracker 119 to determine an appropriate version of the source code to present at a user interface, based on the associations described in connection with act 504 (including act 504a and act 504b). The presentation component 121 then causes this source code version to be presented by the debugger 109.

In embodiments, act 506a comprises presenting at least a portion of the second version of the source code of the software application along with corresponding runtime state associated with the updated existing in-memory entity at the suspension point, based at least on the software application being suspended by the debugger while executing the updated existing in-memory entity. Referring to example 400a, in one example the application is suspended by the debugger 109 during execution of in-memory entity 403b, and the presentation component 121 causes the debugger 109 to present a current version of the source code corresponding to in-memory entity 403b, along with runtime state (e.g., a value of a local variable, a value of a memory location, a current machine code instruction, etc.) associated with in-memory entity 403b.

In other embodiments, act 506a comprises presenting at least a portion of the second version of the source code of the software application along with corresponding runtime state associated with the new in-memory entity at the suspension point, based at least on the software application being suspended by the debugger while executing the new in-memory entity. Referring to example 400b, in one example the application is suspended by the debugger 109 during execution of in-memory entity 404', and the presentation component 121 causes the debugger 109 to present a current version of the source code corresponding to in-memory entity 404', along with runtime state (e.g., a value of a local variable, a value of a memory location, a current machine code instruction, etc.) associated with in-memory entity 404'.

In embodiments, act 506b comprises presenting at least a portion of the first version of the source code of the software application along with corresponding runtime state associated with the existing in-memory entity at the suspension point, based at least on the software application being suspended by the debugger while executing the existing in-memory entity. Referring to example 400b, in one example the application is suspended by the debugger 109 during execution of in-memory entity 403b', and the presentation component 121 causes the debugger 109 to present a stale version of the source code corresponding to in-memory entity 403b', along with runtime state (e.g., a value of a local variable, a value of a memory location, a current machine code instruction, etc.) associated with in-memory entity 403b'. In embodiments, this includes providing a visual indicator that the source code being presented is not the most current version.

Although not shown in FIG. 5, in embodiments, method 500 comprises remapping a suspension location from a first location within the first version of source code to a second location within the second version of source code. In an example, when a code change is identified in act 501 with the application suspended, the debugger 109 is aware of a corresponding suspension location in the first version of the source code (e.g., based on a breakpoint). When the code change is applied using EnC, the application is also suspended. Thus, in embodiments, the live updater 110 remaps this suspension location in the first version of the source code to a corresponding suspension location in the second version of the source code. In embodiments, is remapped suspension location is presented at a user interface (e.g., by the presentation component 121).

To illustrate a first example path through method 500, in embodiments a code change is received while application 106 is suspended by the debugger 109. Thus, in act 503, applying the code change to the software application without restarting the software application comprises applying the code change to the software application using the EnC update (i.e., act 503b), which transforms an existing in-memory entity into an updated existing in-memory entity corresponding to the second version of the source code. In embodiments, the application 106 is later suspended while executing this updated existing in-memory entity. Thus, in act 506, presenting, at the user interface, debug state for the software application at the suspension point comprises presenting at least a portion of the second version of the source code of the software application along with corresponding runtime state associated with the updated existing in-memory entity at the suspension point, based at least on the software application being suspended by the debugger while executing the updated existing in-memory entity (i.e., act 506a).

To illustrate a second example path through method 500, in embodiments a code change is received while application 106 is not suspended by the debugger 109. Thus, in act 503, applying the code change to the software application without restarting the software application comprises applying the code change to the software application using the hot reload update (i.e., act 503a), which creates a new in-memory entity corresponding to the second version of the source code, while preserving an existing in-memory entity. In embodiments, the application 106 is later suspended while executing this new in-memory entity. Thus, in act 506, presenting, at the user interface, debug state for the software application at the suspension point comprises presenting at least a portion of the second version of the source code of the software application along with corresponding runtime state associated with the new in-memory entity at the suspension point, based at least on the software application being suspended by the debugger while executing the new in-memory entity (i.e., act 506a).

To illustrate a third example path through method 500, in embodiments a code change is received while application 106 is not suspended by the debugger 109. Thus, in act 503, applying the code change to the software application without restarting the software application comprises applying the code change to the software application using the hot reload update (i.e., act 503a), which creates a new in-memory entity corresponding to the second version of the source code, while preserving an existing in-memory entity. In embodiments, the application 106 is later suspended while executing the existing in-memory entity. Thus, in act 506, presenting, at the user interface, debug state for the software application at the suspension point comprises presenting at least a portion of the first version of the source code of the software application along with corresponding runtime state associated with the existing in-memory entity at the suspension point, based at least on the software application being suspended by the debugger while executing the existing in-memory entity (i.e., act 506*b*).

As illustrated by an arrow that connects act 504 and act 501, in embodiments, method 500 loops between act 501 and act 504 one or more times, which can create a variety of versions of source code and corresponding in-memory entities. Thus, in one example embodiment of method 500, a first loop of act 501 to act 504 concludes by applying the code change to the software application without restarting the software application, by applying the code change to the software application using the EnC update (i.e., act 504*b*). Then, in a second loop of act 501 to act 504, this example embodiment of method 500 also comprises identifying a subsequent code change to the second version of source code of the software application, resulting in a third version of the source code of the software application (i.e., act 501). Although not shown in FIG. 5, in embodiments, method 500 comprises preserving the second version of source code of the software application. In an example, the version tracker 119 saves the second version of source code (e.g., within source code 111') for later presentation, if needed. In this second loop of act 501 to act 504, this example embodiment of method 500 also comprises determining that the subsequent code change occurred with the software application not suspended by the debugger (i.e., "no" from act 502). Thus, in this second loop of act 501 to act 504, this example embodiment of method 500 also comprises, based on the determining, applying the subsequent code change to the software application using the hot reload update, including creating a second new in-memory entity corresponding to the third version of the source code to reflect the code change, while preserving the new in-memory entity (i.e., act 504*a*). At some time after this second loop of act 501 to act 504, this example embodiment of method 500 also comprises, subsequent to applying the subsequent code change to the software application without restarting the software application, determining that the software application has been suspended by the debugger (i.e., act 505), and presenting, at the user interface, debug state for the software application at a second suspension point (i.e., act 506). In embodiments act 506 includes one of presenting at least a portion of the third version of the source code of the software application along with corresponding runtime state associated with the second new in-memory entity at the second suspension point, based at least on the software application being suspended by the debugger while executing the second new in-memory entity (i.e., act 506*a*), or presenting at least a portion of the second version of the source code of the software application along with corresponding runtime state associated with the new in-memory entity at the second suspension point, based at least on the software application being suspended by the debugger while executing the new in-memory entity (i.e., act 506*b*).

In another example embodiment of method 500, a first loop of act 501 to act 504 concludes by applying the code change to the software application without restarting the software application, by applying the code change to the software application using the hot reload update (i.e., act 504*a*). Then, in a second loop of act 501 to act 504, this example embodiment of method 500 also comprises identifying a subsequent code change to the second version of source code of the software application, resulting in a third version of the source code of the software application (i.e., act 501). Although not shown in FIG. 5, in embodiments, method 500 comprises preserving the second version of source code of the software application. In an example, the version tracker 119 saves the second version of source code (e.g., within source code 111') for later presentation, if needed. In this second loop of act 501 to act 504, this example embodiment of method 500 also comprises determining that the subsequent code change occurred with the software application suspended by the debugger (i.e., "yes" from act 502). Thus, in this second loop of act 501 to act 504, this example embodiment of method 500 also comprises, based on the determining, applying the subsequent code change to the software application using the EnC update, including applying an in-place update to the new in-memory entity corresponding to the second version of the source code to reflect the code change, transforming the new in-memory entity into an updated new in-memory entity corresponding to the third version of the source code (i.e., act 504*b*). At some time after this second loop of act 501 to act 504, this example embodiment of method 500 also comprises, subsequent to applying the subsequent code change to the software application without restarting the software application, determining that the software application has been suspended by the debugger (i.e., act 505) and presenting, at the user interface, debug state for the software application at a second suspension point (i.e., act 506). In embodiments act 506 includes presenting at least a portion of the third version of the source code of the software application along with corresponding runtime state associated with the updated new in-memory entity at the second suspension point, based at least on the software application being suspended by the debugger while executing the updated new in-memory entity (i.e., act 506*a*).

Notably, when performing a hot reload update to a software application, some embodiments not only live update the application itself with new in-memory entities (e.g., methods and types), but also notify other software components (e.g., higher-level libraries) to flush caches that might be invalidated by applying code changes and/or to visually refresh the application's user interface so that changes can take effect. Thus, in some embodiments of method 500, when applying the code change to the software application without restarting the software application comprises applying the code change to the software application using the hot reload update, the method 500 further comprises at least one of (i) notifying a first external software component to flush a cache affected by the hot reload update, or (ii) notifying a second external software component to visually refresh an application user interface. In various embodiments, the first external software component and the second external software component are the same component, or are different components.

Accordingly, the embodiments described herein address a traditional incapability between EnC and hot reload capabilities for applications running with a debugger attached, by enabling a developer to apply source code changes to a subject application that executes with a debugger attached both (i) when the subject application suspended at a breakpoint or watchpoint (i.e., in an EnC mode) and (ii) when the subject application is not suspended (i.e., in a hot reload mode). In embodiments, changes made in both the EnC mode and the hot reload mode can be applied during the same debugger session, and changes made in the EnC mode interact seamlessly with changes made in hot reload mode (and vice versa). The embodiments herein also address cases that can occur when a stale version of a method that was hot reloaded hits a breakpoint, and the old version of the source code is not present in a current source code file or editor buffer.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a hardware storage device comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor, for enabling source code editing that combines edit and continue (EnC) with hot reload, the method comprising:
    based on identifying a first code change to a first version of source code of a software application that is running with a debugger attached, resulting in a second version of the source code of the software application, and based on the first code change having occurred with the software application suspended by the debugger, applying the first code change to the software application using an EnC update, including applying an in-place update to an existing in-memory entity corresponding to the first version of the source code to reflect the first code change, transforming the existing in-memory entity into an updated existing in-memory entity corresponding to the second version of the source code;
    based on identifying a second code change to the software application, and based on the second code change having occurred with the software application not suspended by the debugger, applying the second code change to the software application without restarting the software application using a hot reload update, including,
        creating a new in-memory entity corresponding to a third version of the source code to reflect the second code change, while preserving the existing in-memory entity corresponding to the second version of the source code, and
        notifying an external software component to visually refresh an application user interface; and
    subsequent to applying the EnC update and the hot reload update, presenting, at a user interface, debug state for the software application, including:
        presenting at least a portion of the second version of the source code of the software application along with corresponding runtime state associated with the updated existing in-memory entity at a first suspension point, based at least on the software application being suspended by the debugger while executing the updated existing in-memory entity;
        presenting at least a portion of the third version of the source code of the software application along with corresponding runtime state associated with the new in-memory entity at a second suspension point, based at least on the software application being suspended by the debugger while executing the new in-memory entity; and
        presenting at least a portion of the first version of the source code of the software application along with corresponding runtime state associated with the existing in-memory entity at a third suspension point, based at least on the software application being suspended by the debugger while executing the existing in-memory entity.

2. The method of claim 1, further comprising preserving the first version of the source code of the software application.

3. The method of claim 1, further comprising, when the first code change occurred with the software application suspended by the debugger, determining whether the first code change is compatible with EnC, and wherein the first code change is applied to the software application using the EnC update only when the first code change is determined to be compatible with EnC.

4. The method of claim 1, further comprising, when the second code change occurred with the software application not suspended by the debugger, determining whether the second code change is compatible with hot reload, and wherein the second code change is applied to the software application using the hot reload update only when the second code change is determined to be compatible with hot reload.

5. The method of claim 1, further comprising remapping a suspension location from a first location within the first version of the source code to a second location within the second version of the source code.

6. The method of claim 1, wherein:
    the external software component is a first external software component; and
    applying the second code change to the software application without restarting the software application also includes notifying a second external software component to flush a cache affected by the hot reload update.

7. A computer system for enabling source code editing that combines edit and continue (EnC) with hot reload, comprising:
    a processor; and
    a hardware storage device that stores computer-executable instructions that are executable by the processor to cause the computer system to at least:
        based on identifying a first code change to a first version of source code of a software application that is running with a debugger attached, resulting in a second version of the source code of the software application, and based on the first code change having occurred with the software application suspended by the debugger, apply the first code change to the software application using an EnC update, including applying an in-place update to an existing in-memory entity corresponding to the first version of the source code to reflect the first code change, transforming the existing in-memory entity into an updated existing in-memory entity corresponding to the second version of the source code;

based on identifying a second code change to the software application, and based on the second code change having occurred with the software application not suspended by the debugger, apply the second code change to the software application without restarting the software application using a hot reload update, including,
  creating a new in-memory entity corresponding to a third version of the source code to reflect the second code change, while preserving the existing in-memory entity corresponding to the second version of the source code, and
  notifying an external software component to visually refresh an application user interface; and subsequent to applying the EnC update and the hot reload update, present, at a user interface, debug state for the software application, including:
  presenting at least a portion of the second version of the source code of the software application along with corresponding runtime state associated with the updated existing in-memory entity at a first suspension point, based at least on the software application being suspended by the debugger while executing the updated existing in-memory entity;
  presenting at least a portion of the second third version of the source code of the software application along with corresponding runtime state associated with the new in-memory entity at a second suspension point, based at least on the software application being suspended by the debugger while executing the new in-memory entity; and
  presenting at least a portion of the first version of the source code of the software application along with corresponding runtime state associated with the existing in-memory entity at a third suspension point, based at least on the software application being suspended by the debugger while executing the existing in-memory entity.

8. The computer system of claim 7, the computer-executable instructions also including instructions that are executable by the processor to cause the computer system to, when the first code change occurred with the software application suspended by the debugger, determine whether the first code change is compatible with EnC, and wherein the first code change is applied to the software application using the EnC update only when the first code change is determined to be compatible with EnC.

9. The computer system of claim 7, the computer-executable instructions also including instructions that are executable by the processor to cause the computer system to, when the second code change occurred with the software application not suspended by the debugger, determine whether the second code change is compatible with hot reload, and wherein the second code change is applied to the software application using the hot reload update only when the second code change is determined to be compatible with hot reload.

10. The computer system of claim 7, the computer-executable instructions also including instructions that are executable by the processor to cause the computer system to preserve the first version of the source code of the software application.

11. The computer system of claim 7, the computer-executable instructions also including instructions that are executable by the processor to cause the computer system to remap a suspension location from a first location within the first version of the source code to a second location within the second version of the source code.

12. The computer system of claim 7, wherein:
  the external software component is a first external software component; and
  applying the second code change to the software application without restarting the software application also includes notifying a second external software component to flush a cache affected by the hot reload update.

13. A hardware storage device that stores computer-executable instructions that are executable by a processor to cause a computer system to enable source code editing that combines edit and continue (EnC) with hot reload, the computer-executable instructions including instructions that are executable by the processor to cause the computer system to at least:
  based on identifying a first code change to a first version of source code of a software application that is running with a debugger attached, resulting in a second version of the source code of the software application, and based on the first code change having occurred with the software application suspended by the debugger, apply the first code change to the software application using an EnC update, including applying an in-place update to an existing in-memory entity corresponding to the first version of the source code to reflect the first code change, transforming the existing in-memory entity into an updated existing in-memory entity corresponding to the second version of the source code;
  based on identifying a second code change to the software application, and based on the second code change having occurred with the software application not suspended by the debugger, apply the second code change to the software application without restarting the software application using a hot reload update, including,
    creating a new in-memory entity corresponding to a third version of the source code to reflect the second code change, while preserving the existing in-memory entity corresponding to the second version of the source code, and
    notifying an external software component to visually refresh an application user interface; and
  subsequent to applying the EnC update and the hot reload update, present, at a user interface, debug state for the software application, including:
    presenting at least a portion of the second version of the source code of the software application along with corresponding runtime state associated with the updated existing in-memory entity at a first suspension point, based at least on the software application being suspended by the debugger while executing the updated existing in-memory entity;
    presenting at least a portion of the third version of the source code of the software application along with corresponding runtime state associated with the new in-memory entity at a second suspension point, based at least on the software application being suspended by the debugger while executing the new in-memory entity; and
    presenting at least a portion of the first version of the source code of the software application along with corresponding runtime state associated with the existing in-memory entity at a third suspension point, based at least on the software application being suspended by the debugger while executing the existing in-memory entity.

14. The hardware storage device of claim 13, the computer-executable instructions also including instructions that are executable by the processor to cause the computer system to preserve the first version of the source code of the software application.

15. The hardware storage device of claim 13, the computer-executable instructions also including instructions that are executable by the processor to cause the computer system to, when the first code change occurred with the software application suspended by the debugger, determine whether the first code change is compatible with EnC, and wherein the first code change is applied to the software application using the EnC update only when the first code change is determined to be compatible with EnC.

16. The hardware storage device of claim 13, the computer-executable instructions also including instructions that are executable by the processor to cause the computer system to, when the second code change occurred with the software application suspended by the debugger, determine whether the second code change is compatible with hot reload, and wherein the second code change is applied to the software application using the hot reload update only when the second code change is determined to be compatible with hot reload.

17. The hardware storage device of claim 13, the computer-executable instructions also including instructions that are executable by the processor to cause the computer system to determine remapping a suspension location from a first location within the first version of the source code to a second location within the second version of the source code.

18. The hardware storage device of claim 13, wherein:
the external software component is a first external software component; and
applying the second code change to the software application without restarting the software application also includes notifying a second external software component to flush a cache affected by the hot reload update.

\* \* \* \* \*